United States Patent
Carlson et al.

(10) Patent No.: US 11,717,892 B1
(45) Date of Patent: Aug. 8, 2023

(54) ADDITIVELY FEATURED PLATES FOR HEAT EXCHANGERS

(71) Applicants: National Technology & Engineering Solutions of Sandia, LLC, Albuquerque, NM (US); Vacuum Process Engineering, Inc., Sacramento, CA (US)

(72) Inventors: Matthew David Carlson, Eau Claire, WI (US); Yasmin Dennig, Albuquerque, NM (US); Judith Maria Lavin, Albuquerque, NM (US); David M. Keicher, Albuquerque, NM (US); Carl Schalansky, Sacramento, CA (US)

(73) Assignees: National Technology & Engineering Solutions of Sandia, LLC, Albuquerque, NM (US); Vacuum Process Engineering, Inc., Sacramento, CA (US)

(*) Notice: Subject to any disclaimer, the term of this patent is extended or adjusted under 35 U.S.C. 154(b) by 22 days.

(21) Appl. No.: 17/462,072

(22) Filed: Aug. 31, 2021

(51) Int. Cl.
*B22F 10/28* (2021.01)
*B33Y 10/00* (2015.01)
*F28D 1/053* (2006.01)

(52) U.S. Cl.
CPC ............ *B22F 10/28* (2021.01); *B33Y 10/00* (2014.12); *F28D 1/05383* (2013.01); *F28F 2260/02* (2013.01)

(58) Field of Classification Search
None
See application file for complete search history.

(56) References Cited

U.S. PATENT DOCUMENTS

2015/0137412 A1* 5/2015 Schalansky ............... B22F 5/10
264/129
2017/0202691 A1* 7/2017 Labelle .................... A61F 2/915

OTHER PUBLICATIONS

Lamikiz, A., et al. "Laser Polishing of Parts Built up by Selective Laser Sintering." International Journal of Machine Tools and Manufacture, vol. 47, No. 12-13, 2007, pp. 2040-2050., https://doi.org/10.1016/j.ijmachtools.2007.01.013. (Year: 2007).*

* cited by examiner

*Primary Examiner* — Anthony M Liang
(74) *Attorney, Agent, or Firm* — Mark A. Dodd (57) ABSTRACT

Hybrid additive featured plates used to form an overall microchannel heat exchanger and corresponding method of manufacture are disclosed. Various additive manufacturing (AM) techniques may be used to form walls defining microchannel features on a plate substrate. The manufacturing method is a hybrid process in that leverages both additive and conventional manufacturing techniques to minimize both cost and fabrication time.

16 Claims, 6 Drawing Sheets

ADDITIVELY FEATURED PLATES FOR HEAT EXCHANGERS

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to heat exchanger plates that contain detailed features created by various additive manufacturing processes. These featured plates, sometimes called "shims" when the plates are very thin, may be subsequently post-treated and bonded together to manufacture microchannel heat exchangers with intricate internal passageways.

BACKGROUND

The core of a plate-style microchannel heat exchanger is typically formed by bonding hundreds to thousands of featured plates. Each individual plate includes features that define a plurality of channels through which the hot or cold fluids flow. It is often desirable to create complex channel geometries such as those that are curved and/or contain features on the channel surface to enhance heat transfer to or from the fluid in the channel. These complex geometries are difficult to form using standard manufacturing methods, such as chemical etching and physical methods including stamping or roll forming.

Chemically etched plates make up the bulk of the cost to fabricate a diffusion bonded microchannel heat exchanger due to both the cost of the base plate material (advanced nickel alloys in some designs) and the added cost of etching these plates to form channel features in the plate. While this manufacturing process can be used to manufacture a large number of identical plates, it is a subtractive process that creates material wastage, employs highly acidic etchant solutions that are environmentally hazardous and costly to dispose of, takes weeks to months to produce enough plates for a single microchannel heat exchanger, and becomes increasingly difficult as new compositions of plate material become more resistant to chemical attack.

Additively manufactured heat exchangers have been fabricated from a variety of materials, including those with high corrosion resistance, and have demonstrated the ability to form the varied and complex internal flow passages needed for high performance microchannel heat exchangers. However, the cost of simple shapes like plates and tubes produced using additive manufacturing (AM) is much higher than the cost using conventional techniques. Further, secondary processing, for example, hot isostatic pressing, is usually required to densify the additively deposited material to achieve reliable material properties matching those of the base plate material.

Thus, there is a need for a high performance microchannel heat exchanger, and corresponding fabrication method, having reduced cost, reduced manufacturing time, reduced wastage, and reduced environmental impact.

SUMMARY

One aspect of the present invention relates to a hybrid AM approach to fabricate an overall microchannel heat exchanger. This hybrid approach leverages AM techniques to form features that define channels on the surface of a smooth plate produced using conventional forming techniques, for example, rolling, stamping, or pressing. These featured plates are then bonded using standard techniques, for example, diffusion bonding, transient liquid phase bonding, brazing, or reaction bonding, to form a plate-style micro-channel heat exchanger. This bonding step can both join the featured plates together while simultaneously densifying the additively deposited material to produce acceptable material properties.

As the walls defining the channels on the surface of the plate constitute a small fraction of the overall volume, most of the microchannel heat exchanger mass is formed from low-cost plate material with reliable material properties. The AM material on the plate is also relatively thin, thereby enabling more thorough inspection to identify potential defects.

This hybrid AM approach offers several benefits over an all AM approach. The all AM approach would be both very slow and very expensive. This is especially true when considering that an individual core may include hundreds if not thousands of plates. Further, to support the planar portion of a plate during manufacturing, the volume of the channels may, depending upon the type of AM being employed, need to be filed with material that is removed in a subsequent processing step, thereby adding complexity and cost. In addition, the all AM approach would still require the densification step.

Three different AM techniques, including screen printing, cold spray, and laser powder bed fusion, have already been used by the inventors to successfully manufacture prototypic featured plates, though other AM techniques may be employed in the future including electron beam powder bed fusion, laser flash sintering, etc. In screen printing, an ink with the desired final material, for example, stainless steel 316 particles, is transferred onto a plate substrate using a patterned screen. In cold spray, fine particles of the desired material are accelerated to a high velocity and bond together on the plate substrate. In laser powder bed fusion, a thin layer of particles of the desired material is spread over the plate substrate and selectively melted and fused together using a laser. The additively manufactured plates are then joined using a bonding process to form the core of the microchannel heat exchanger.

In at least one embodiment of the present invention, a process for forming a microchannel heat exchanger core comprises the steps of providing one or more plate substrates, printing microchannel walls on the one or more plate substrates using an additive manufacturing (AM) process, thereby producing one or more AM featured plates, and bonding the one or more AM featured plates together to form the microchannel heat exchanger core (the bonding step simultaneously joining the AM featured plates and densifying the microchannel walls).

In various embodiments, the one or more plate substrates include one or more of a metal, a metal alloy, or a ceramic, and the one or more plate substrates have a thickness of between approximately 0.1 mm and 3 mm; the microchannel walls have a width of between approximately 0.1 mm and 3 mm and the microchannel walls have a height of between approximately 0.1 mm and 3 mm; the microchannel walls include one or more of a metal, a metal alloy, a ceramic, or a precursor material; the AM process is a screen printing process employing an ink, the ink including metal particles, a photopolymer, and optionally cellulose acetate propionate and the screen printing process includes the steps of exposing the photopolymer to light (the light curing the photopolymer) and burning off at least the photopolymer; the AM process is a cold spray process; the cold spray process includes a step of selective laser annealing; the AM process is a laser bed powder fusion process; the laser bed powder fusion process includes a step of laser polishing or a high-intensity plasma arc flash lamp process; the bonding step employs heat; the bonding step further employs pressure; the bonding step employs one of diffusion bonding, transient liquid phase bonding, brazing, or reaction bonding; the printing step produces a plurality of AM featured plates on each of the one or more plate substrates and the process further includes a step of dicing the plurality of AM featured plates on each of the one or more plate substrates.

In at least one embodiment of the present invention, a process for forming a microchannel heat exchanger comprises the steps of providing one or more plate substrates, printing microchannel walls on the one or more plate substrates using an additive manufacturing (AM) process (thereby producing one or more AM featured plates), bonding the one or more AM featured plates together to form the microchannel heat exchanger core (the bonding step simultaneously joining the AM featured plates and densifying the microchannel walls), and forming hot and cold inlet and outlet headers adjacent to the microchannel walls.

In various embodiments, the forming step includes one of attaching the hot and cold inlet and outlet headers to the microchannel heat exchanger core or forming the hot and cold inlet and outlet headers integral with the microchannel heat exchanger core; the AM process is one of a screen printing process, a cold spray process, a laser bed powder fusion process, an electron beam powder bed fusion process, or a laser flash sintering process; and the bonding step employs one of diffusion bonding, transient liquid phase bonding, brazing, or reaction bonding.

In at least one embodiment of the present invention, a process for forming additive manufactured (AM) featured plates comprises the steps of providing one or more plate substrates, printing microchannel walls on each of the one or more plate substrates using an additive manufacturing process (thereby producing the AM featured plates, the printing step producing a plurality of AM featured plates on each of the one or more plate substrates).

In various embodiments, the AM process is one of a screen printing process, a cold spray process, a laser bed powder fusion process, an electron beam powder bed fusion process, or a laser flash sintering process; and the process further includes the step of dicing the plurality of AM featured plates on each of the one or more plate substrates.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 3A is a top down photograph of a series of screen-printed walls while

FIG. 4A is a top down photograph of a series of wide and fine pitch cold-sprayed walls while

DETAILED DESCRIPTION

Microchannel Heat Exchangers

Figure 1:
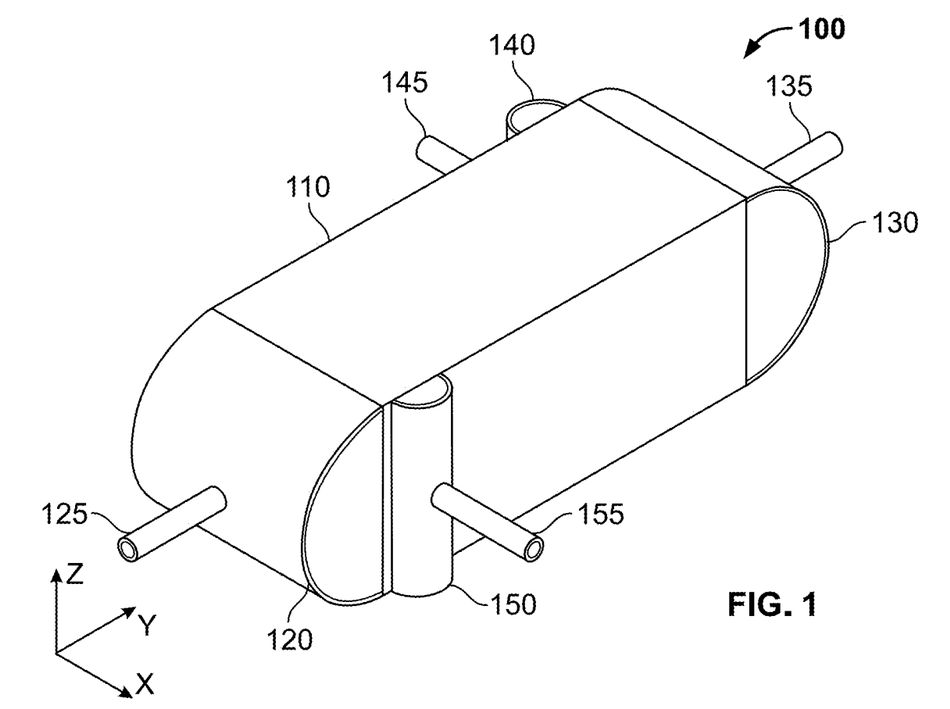
FIG. 1 illustrates an embodiment of a microchannel heat exchanger in accordance with one or more embodiments of the present invention.

FIG. 1 illustrates an embodiment of a microchannel heat exchanger 100 in accordance with one or more embodiments of the present invention. The microchannel heat exchanger 100 includes a core 110, a hot inlet header 120, a hot outlet header 130, a cold inlet header 140, and a cold outlet header 150. The hot inlet header 120 includes a hot inlet 125. The hot outlet header 130 includes a hot outlet 135. The cold inlet header 140 includes a cold inlet 145. The cold outlet header 150 includes a cold outlet 155.

As illustrated in FIG. 1, the core 110 has a linear, rectangular, solid shape, having a square cross-section. In other embodiments, the core 110 may have other shapes, such as, but not limited to cubic, non-linear, or curved cores. In various embodiments, the curved cores may be, but are not limited to non-convex shapes such as a toroid or the shell of a piece of equipment. In yet other embodiments, the cross-section may be, but is not limited to square, rectangular, hexagon, octagon and other polygons, and non-convex shapes to allow for maximum space utilization in volume-sensitive applications. While the microchannel heat exchanger 100 illustrated in FIG. 1 includes separate inlet headers 120, 140 and outlet headers 130, 150, some embodiments of the present invention may have the headers formed integrally with the core rather than being external to the core. In yet other embodiments of the present invention, only a single fluid flow may be employed, for example, a cold plate, while other embodiments may employ more than two fluid flows.

Figure 2A:
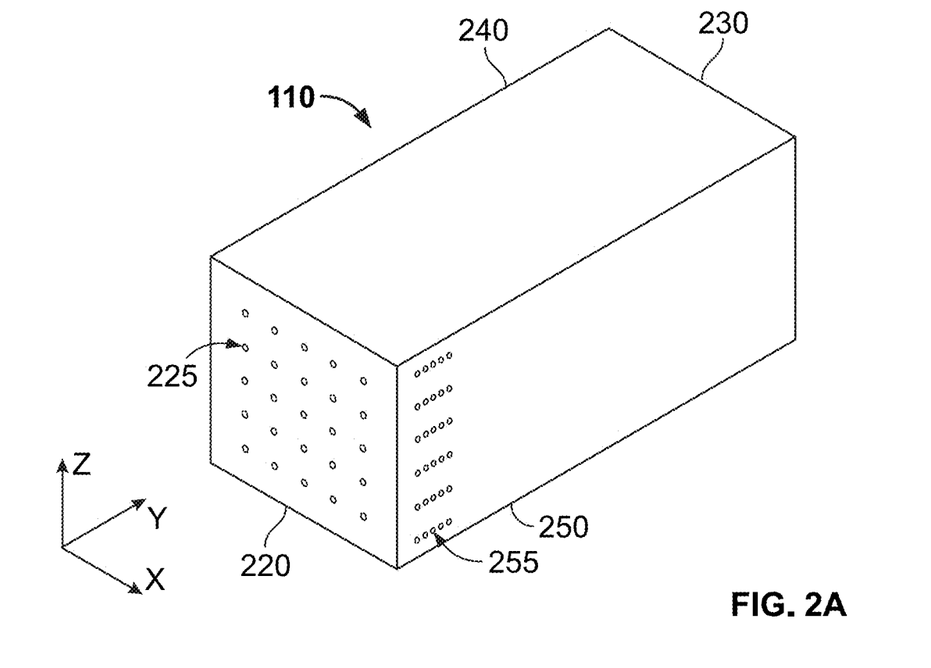
FIGS. 2A and 2B illustrate the core and part of a cutaway view of the core of a microchannel heat exchanger in accordance with one or more embodiments of the present invention.

FIG. 2A illustrates the core 110 of FIG. 1. The core 110 includes a hot inlet side 220, a hot outlet side 230, a cold inlet side 240, and a cold outlet side 250. The hot inlet side 220 includes a plurality of hot channel inlets 225. The hot outlet side 230 includes a plurality of corresponding hot channel outlets (not illustrated). The cold inlet side 240 includes a plurality of cold channel inlets (not illustrated). The cold outlet side 250 includes a plurality of corresponding cold channel outlets 255. In other embodiments, the plurality of hot channel inlets and plurality of cold channel outlets may be on the same side of the core. In various embodiments, the plurality of hot channel outlets and plurality of cold channel inlets may be on the same side of the core.

Figure 2B:
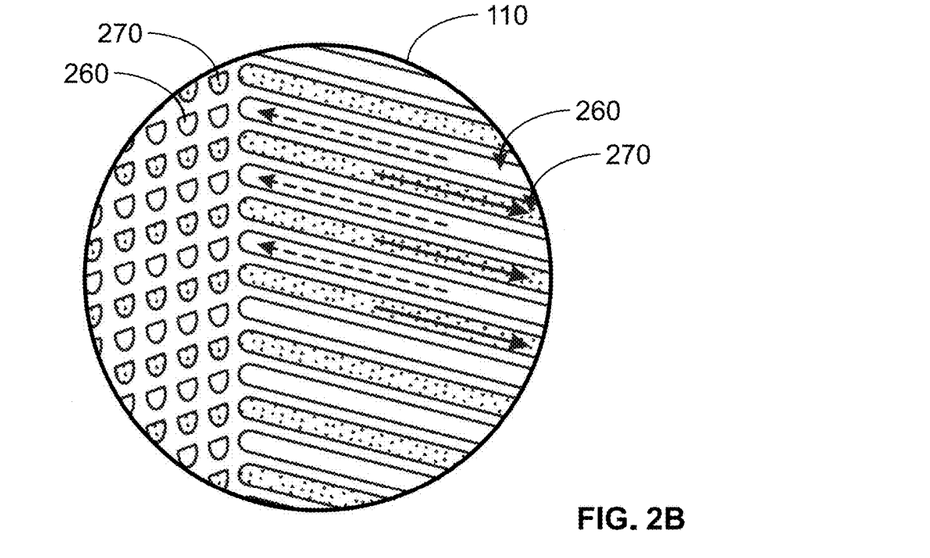

FIG. 2B illustrates part of a cutaway view of the core 110 of FIG. 1. A first set of channels 260 in the core 110 carries the hot fluid in a first direction from the hot inlet side 220 to the hot outlet side 230. A second set of channels 270 in the core 110 carries the cold fluid in a second direction, opposite the first direction, from the cold inlet side 240 to the cold outlet side 250. As illustrated in FIG. 2B, the first set of channels 260 is interleaved with the second set of channels 270. In other embodiments of the present invention, the channels may be arranged in parallel flow, cross-counter flow, or other flow configurations. As will be appreciated by those of ordinary skill in the art, some embodiments of the present invention enable one flow to mix with one or more other flows within the core to facilitate a chemical reaction.

Featuring of Plates

Several different additive manufacturing (AM) techniques may be employed to form the walls of the featured plates. These various techniques include, but are not limited to, screen printing, cold spray, and laser powder bed fusion, which will be described below.

Screen Printing

Screen printing employs a mesh to transfer an ink onto a substrate, except in areas made impermeable to the ink by a patterned blocking emulsion. A blade (or squeegee) is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed.

As applied to printing plates in accordance with one or more embodiments of the present invention, the traditional screen-printing process is modified to use an ink containing the desired material. For example, the ink may contain particles of stainless steel having a size in the range of 20-25 µm. The ink may also contain additional materials, including, for example, photopolymers and cellulose acetate propionate. The photopolymers act as a structural component and binds the metal particles together. By subjecting the printed plates to 365 nm ultraviolet (UV) light, the photopolymers are cured, resulting in a robust and rigid structure. Cellulose acetate propionate may be added to increase the viscosity of the ink. By controlling the viscosity of the ink, one can control lateral growth of the printed walls and thereby generate more defined, higher resolution channels. The substrate is a smooth plate of the desired size. Given the flexibility of the screen-printing process, plate substrates as large as four feet by eight feet or larger may be feasible. Given the typical desired feature sizes for the walls between adjacent channels and the period of the channels, the mesh may have openings in the range of 60-120 µm. The size of the mesh openings may be selected based upon the quality and resolution of the wall feature sizes. As the height of the walls between channels may be greater than what can be printed in a single pass of the screen-printing process, additional passes may be required.

Once screen printing is completed, the resultant featured plate is subjected to three additional steps. In the first step, the featured plate is exposed to 365 nm UV light for 30 seconds, thereby curing the photopolymer. In the second step, the featured plate is subjected to a low temperature ramp to burn off the organic components of the ink, for example, the photopolymers and the cellulose acetate propionate in an air atmosphere. This low temperature burn off involves a temperature ramp from 150° C. to 250 to 350° C. at a ramp rate of approximately 1° C./min. The resulting metal matrix is then subjected to a third step—a sintering step in which the metal matrix is subjected to heat and/or pressure to densify the metal matrix without melting it. The sintering step involves changing the atmosphere to hydrogen or forming gas. The temperature is ramped at a rate of up to approximately 15° C./minute to a temperature of greater than 70% of the melting point of the metal matrix and held there for several hours. The featured plate is then allowed to gradually cool to room temperature. One alternative sintering process that may be employed in certain embodiments of the present invention is hot isostatic pressing (HIP). HIP simultaneously subjects the featured plate to elevated temperatures and isostatic gas pressure in a high-pressure containment vessel. Yet another alternative sintering process that may be employed in certain embodiments of the present invention is a laser treatment that heats the metal matrix, for example to between 30 and 80% of the melting point of the metal matrix. A further alternative sintering process that may be employed in certain embodiments of the present invention employs a high-intensity plasma arc flash lamp that produces an intense heat pulse that melts and densifies the metal matrix.

Figure 3A:
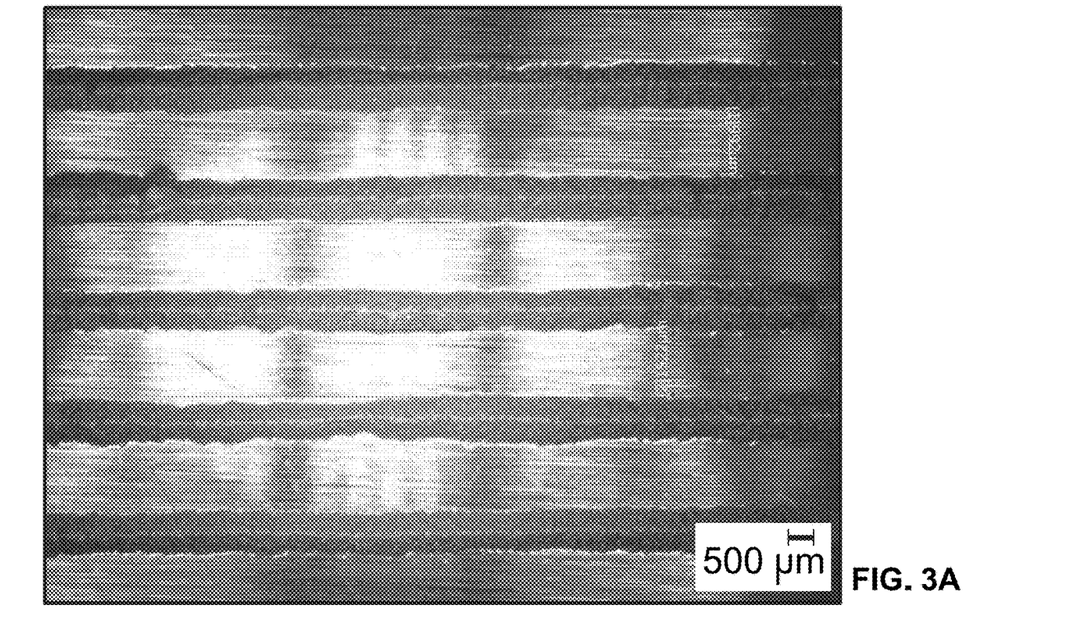
Figure 3B:
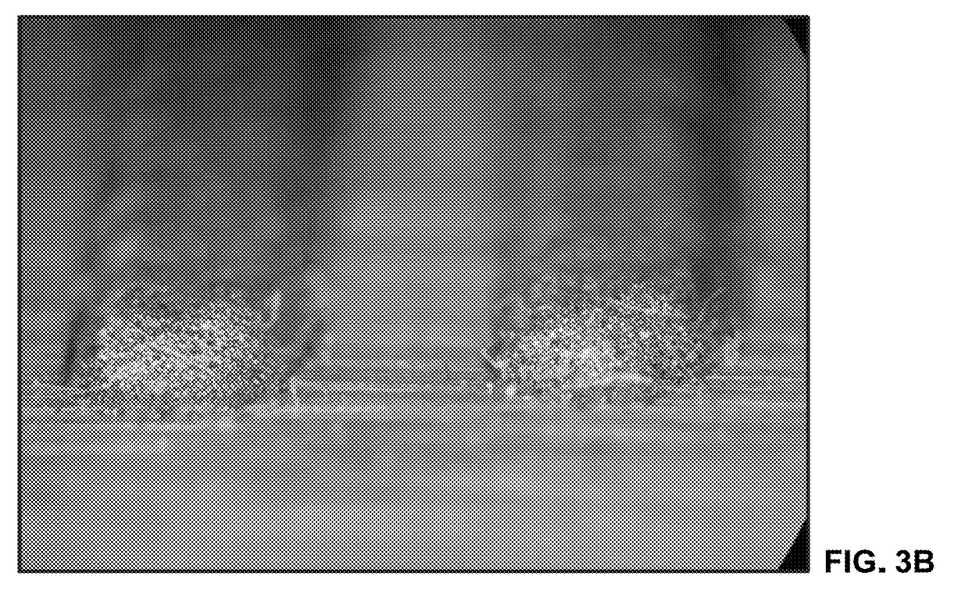
FIGS. 3B and 3C are perspective photographs of the series of screen-printed walls in accordance with one or more embodiments of the present invention.
Figure 3C:
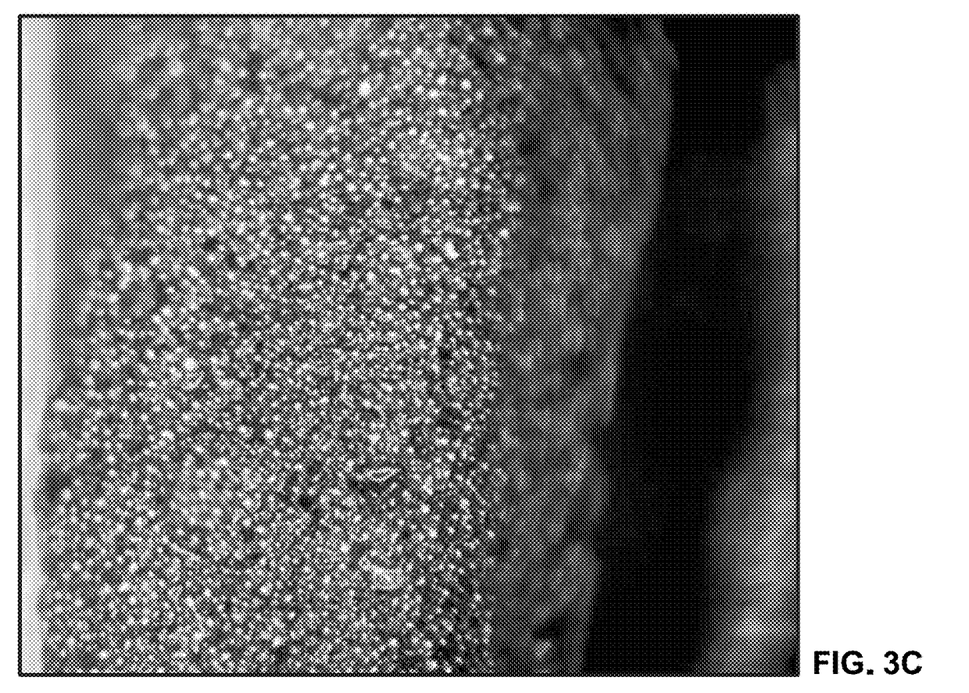

FIG. 3A is a top down photograph of a series of screen-printed walls formed of 304 stainless steel. The walls have a height of approximately 0.7 mm and a width of approximately 1.0 mm. FIGS. 3B and 3C are perspective photographs of a series of screen-printed walls formed of 304 stainless steel before and after the burn off and sintering processes, respectively. In various embodiments of the present invention the screen printed walls may have a height between approximately 0.1 mm and 3 mm, and a width between approximately 0.1 mm and 3 mm.

Cold Spray

Cold spray is a solid-state deposition process in which metal feed stock powder is sprayed at high velocity, for example, in the range of 500-1000 m/s, and low temperature, for example, room temperature. Metal feed stock powder experiences significant mechanical deformation upon impact. This deformation forms an adiabatic shear instability at the particle-substrate contact which breaks surface oxides, induces shear at the particle-substrate interface, and ejects material from the particle-substrate interface. Shear processes at particle/particle and particle/substrate interfaces result in solid-state metallurgical bonding. High shear also results in significant plastic deformation of the impacting particle and the substrate surface. As subsequent particles impact and consolidate, a coating or bulk shape is formed.

Mechanical properties of both the substrate and the impacting particle significantly affect the total energy required for deposition and affect the deposit characteristics. The critical velocity, i.e., the velocity where there is sufficient kinetic energy for particle adhesion, is inversely dependent on particle density. As material density increases, critical velocity is expected to decrease, all other properties remaining constant.

Cold spray coating build-up is often a balance between deposition and erosion and may depend upon the metal feed stock composition. The metal feed stock may include, for example, 304 stainless steel and 316 stainless steel. The metal feed stock particle size is typically in the range of 1 to 50 μm, and total deposition thicknesses from 0.1 mm to 3 mm can be readily achieved.

Patterning of a cold spray coating may employ a mask. For creating the walls required for various embodiments, an aluminum mask with slit openings may be employed. As a layer of the metal feed stock may build up on the mask, the geometric fidelity of the walls suffers, typically forming a pyramidal wall that is wider at the base than at the top. This may also result in variation in the height of the walls, which can impact the subsequent bonding process.

In some embodiments, a laser assisted cold spray process may be employed. In the laser assisted cold spray process, a laser heats the deposition site to between 30 and 80% of the particle melting point. This significantly reduces particle strength and allows the particles to deform and build up a coating although they only impact the substrate at velocities around half those used in the traditional cold spray process.

Figure 4A:
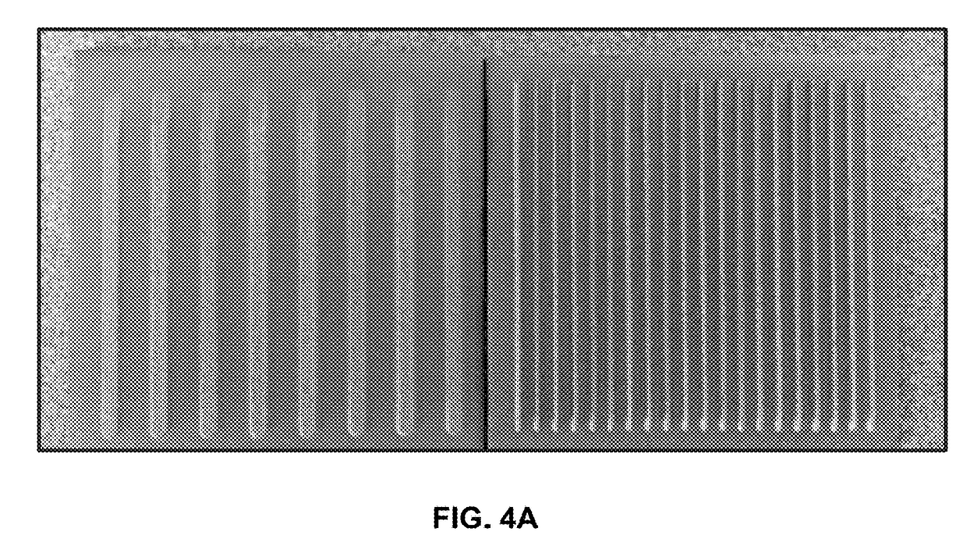
Figure 4B:
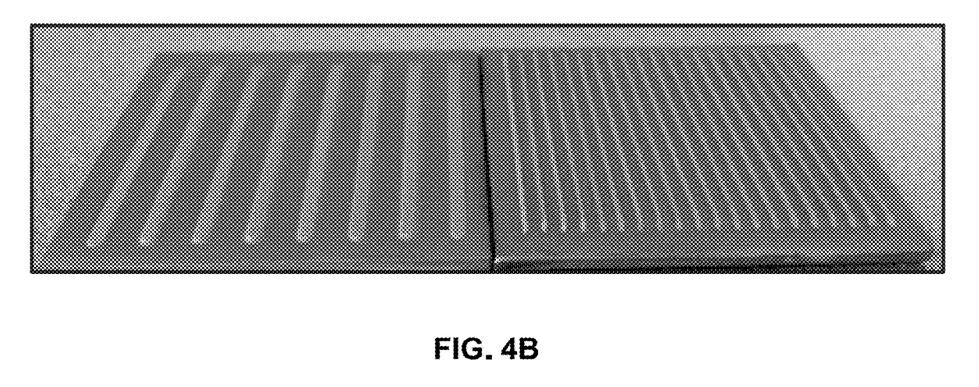
FIG. 4B is a perspective photograph of a series of wide and fine pitch cold-sprayed walls in accordance with one or more embodiments of the present invention.

FIG. 4A is a top down photograph of a series of wide and fine pitch cold-sprayed walls formed of 316 stainless steel. The wide pitch and fine pitch walls have heights of approximately 0.5 mm and 0.7 mm, respectively. The wide pitch and fine pitch walls have widths of approximately 2.1 mm and 1.1 mm, respectively. FIG. 4B is a perspective photograph of a series of wide and fine pitch cold-sprayed walls formed of 316 stainless steel. In various embodiments of the present invention, the cold-sprayed walls may have a height between approximately 0.1 mm and 3 mm, and a width between approximately 0.1 mm and 3 mm.

Laser Powder Bed Fusion

Laser powder bed fusion, also known as direct metal laser sintering or selective laser melting, is a process whereby metallic powder is selectively melted and sintered using a laser in a two-dimensional pattern defined by a CAD model geometry. After each pattern is completed an additional layer of powdered metal is spread across its surface and another pattern sintered, building up a three-dimensional geometry layer by layer.

In accordance with one or more embodiments of the present invention, laser powder bed fusion is used to form the walls between the channels on the plate substrate, thereby forming the featured plate. In certain embodiments, the featured plate may be subjected to a laser polishing process in which the laser passes over the surface of the walls at a rate just fast enough to melt and smooth out any rough peaks on the top of the walls without requiring any mechanical machining step. Other post-processing may be employed in other embodiments to flatten the top of the walls including, for example, the high-intensity plasma arc lamp process noted above. In other embodiments, smaller powder particles may be used to create smoother wall tops, though this approach may require additional patterned layers as each layer may be thinner.

The metal powder used in the laser powder bed fusion process may, for example, be 304 stainless steel and 316 stainless steel. The particle size of the metal powder is typically in the range of 1 to 50 μm, resulting in a single layer thickness of 50 to 300 μm.

Figure 5:
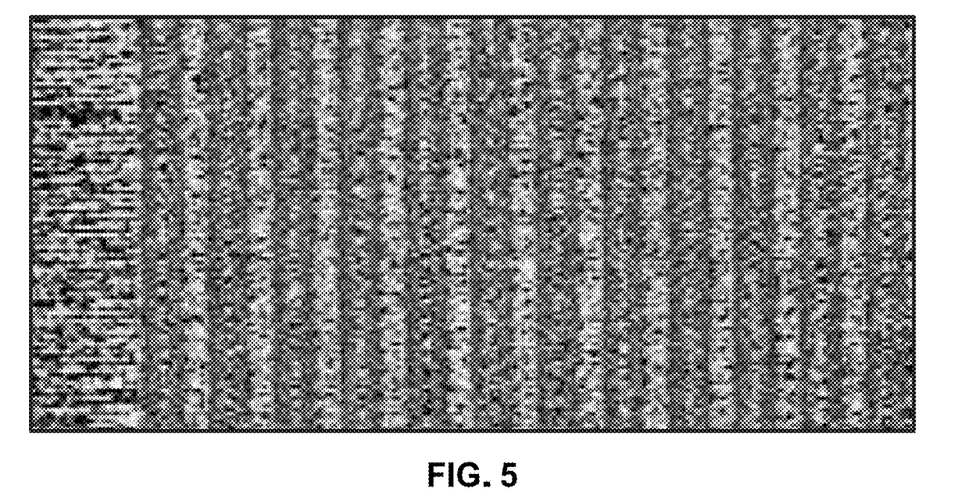
FIG. 5 is a top down photograph of a series of walls formed by laser powder bed fusion in accordance with one or more embodiments of the present invention.

FIG. 5 is a top down photograph of a series of walls formed by laser powder bed fusion of 316 stainless steel. The walls have a height of approximately 0.8 mm and a width of approximately 1.1 mm. In various embodiments of the present invention, the laser powder bed fused walls may have a height between approximately 0.1 mm and 3 mm, and a width between approximately 0.1 mm and 3 mm.

The plate substrates for the screen-printing, the cold spray, and the laser powder bed fusion processes, or any other AM process employed by various embodiments of the present invention, may have any suitable composition. The composition may include a metal or a metal alloy, for example, stainless steels 304 or 316, nickel alloy 625, 617, 718, 230, or 740H, aluminum alloy 6061; a ceramic, for example, silicon carbide, graphite, mullite, or some other material. Plate substrates may have any suitable thickness. The plate substrate thickness may, for example, be between approximately 0.1 mm and 3 mm.

The ink for the screen-printing embodiment, the metal feed stock for the cold spray process, and the powdered metal in the laser powder bed fusion may have any suitable composition. The composition may include a metal or a metal alloy, for example, various stainless steels, such as 304 stainless steel, 316 stainless steel, and 347 stainless steel; steel, such as 800H steel; or various nickel alloys, such as nickel alloy 230, nickel alloy 282, nickel alloy 617, nickel alloy 625, nickel alloy 718, and nickel alloy 740H. In certain embodiments of the present invention, non-metals may be employed. For example, ceramics, such as graphite, silicon carbide, and mullite may be employed. In certain embodiments of the present invention, the deposited AM material may include a precursor material, for example, a graphite powder or a mixture of graphite and silicon to enable a reaction bond to form during the sintering and densification steps to produce silicon-silicon carbide.

Bonding of Plates

Several different techniques may be employed to bond the AM featured plates together while simultaneously densifying the AM material. These various techniques include, but are not limited to, diffusion bonding, transient liquid phase bonding, brazing, and reaction bonding.

Diffusion Bonding

Diffusion bonding is a joining technique wherein two surfaces are brought into close contact without the presence of a protective oxide layer, thereby allowing chemical bonds to form between the two surfaces. To achieve this result the two surfaces must be sufficiently smooth, clean of surface contaminants and impurities, and there must be a high mechanical force for bonding. In metals, these requirements are typically met by placing smooth materials in contact within a vacuum hot press. A vacuum or slightly reducing atmosphere is set up as the materials are brought above 70% of their melting point in order to reduce surface oxides, and a ram within the vacuum hot press forces the materials into contact to both crush any remaining roughness, for example, in the top surfaces of the walls, and to aid in bonding. As the interfacing layer between the two materials experiences high mechanical forces, the two materials join, and the applied load and high temperature drive continued diffusion to fully join the entire interfacing area over the course of several hours.

While diffusion bonding is traditionally used to join two materials along a planar interface, this process is a special case of the sintering process generally. As such, the diffusion bonding process may serve to both join the interfaces between AM featured plates while simultaneously sintering the AM material defining the walls between the channels on each AM featured plate. This is similar to the annealing and hot isostatic press (HIP) processes that are used sequentially to sinter and densify bulk AM material.

Transient Liquid Phase Bonding

Transient liquid phase (TLP) bonding is a bonding process that joins substrate materials using an interlayer. When heated, the interlayer melts and the interlayer element (or when an alloy is used for the interlayer, a constituent thereof) diffuses into the lattice and grain boundaries of the higher melting point substrate materials, causing isothermal solidification. The result is the formation of an inter-metallic layer between the substrate materials. The interlayer may be formed by the AM process as the last step in the formation of the walls such that the interlayer material is a cap on the top of the walls.

Brazing

Brazing is (typically) a metal joining process in which the substrate materials are joined together by melting and flowing a filler metal into a joint between the substrates, with the filler metal having a lower melting point than the substrates. Brazing differs from welding in that brazing does not involve melting the work pieces, for example, the substrates. Brazing differs from soldering in that brazing uses higher temperatures for a similar process, while also requiring much more closely fitted parts than when soldering. The filler metal flows into the gap between close-fitting parts, for example the tops of the walls on one AM featured plate and the back side of the next AM featured plate, by capillary action. The filler metal is brought slightly above its melting (liquidus) temperature while being protected by a suitable atmosphere, usually a flux. The filler metal then flows over the parts, in a process known as wetting, and is then cooled, thereby joining the parts, for example, the AM featured plates, together. While brazing is typically a metal joining process, it can also be used for joining ceramics.

Reaction Bonding

Reaction bonding involves a chemical reaction between porous carbon (or graphite) and molten silicon. In various embodiments of the present invention, this reaction bonding process may occur during the high temperature bonding process that also sinters and densities the printed walls. This reaction bonding process produces a silicon-silicon carbide interlayer, sometimes referred to as a silicon metal infiltrated ceramic, between the tops of the walls on one substrate and the back side of the next substrate. The interlayer materials of graphite and silicon may be formed by the AM process as the last step in the formation of the walls such that the interlayer materials are a cap on the top of the walls. Reaction-bonded silicon carbide is impermeable to oxygen, and thus offers the advantage that it is resistant to internal oxidation at high temperatures.

Overall Hybrid Process

Figure 6:
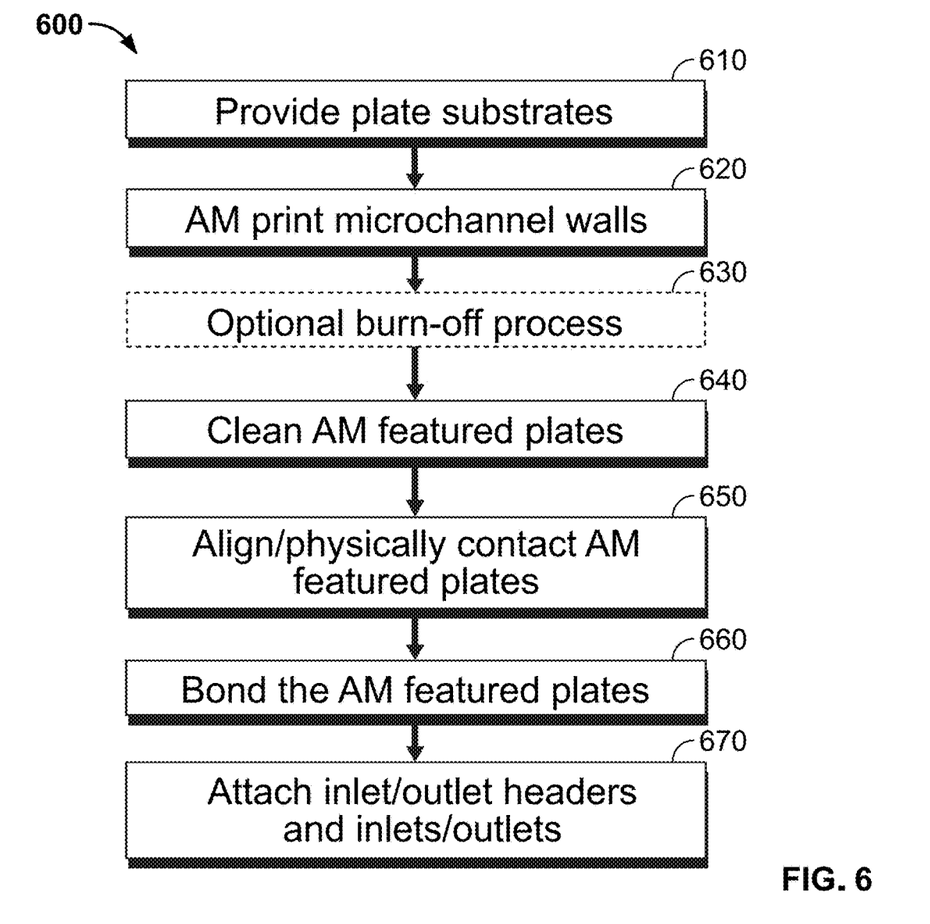
FIG. 6 illustrates a process flow of an overall hybrid method of forming additively manufactured featured plates and a corresponding microchannel heat exchanger in accordance with one or more embodiments of the present invention.

FIG. 6 illustrates a process flow 600 for the overall hybrid method of forming AM featured plates and a corresponding microchannel heat exchanger in accordance with one or more embodiments of the present invention. The hybrid method begins in step 610 by providing one or more plate substrates. In step 620, the walls to define the desired microchannels are printed using an AM process. This AM process may, for example, be screen printing, cold spray, or laser powder bed fusion. In optional step 630, if the AM featured plates were screen printed, they are subjected to a burn-off process. In step 640, a preprocessing step cleans the surfaces of the AM featured plates. In step 650, a prebonding step aligns the surfaces of the AM featured plates being bonded and then brings them into physical contact with each other. In step 660, the AM featured plates undergo a bonding step to bond together the AM featured plates, which simultaneously sinters the AM printed walls. The result of step 660 is a completed core. In step 670, hot and cold inlet and outlet headers and corresponding inlet and outlets are attached to the core to form the completed microchannel heat exchanger.

The process flow illustrated in FIG. 6 includes, in some embodiments of the present invention, a dicing step. This optional dicing step is included when the plate substrates are larger than the desired size of the AM featured plates. This optional dicing step allows one to fabricate multiple AM featured plates simultaneously in a single AM printing process, in a manner similar to forming multiple die on a single semiconductor wafer. This optional dicing step may be placed at various places in the process flow illustrated in FIG. 6, for example, after step 620, after step 630, after step 640, or after step 660.

In some embodiments of the present invention, the core block may contain integral headers, and thus the external headers attached in step 670 are not needed, though external inlets and outlets may still require attachment to the core block. These integral headers may be formed, for example, as part of step 620, i.e., at the same time as the walls to define the desired microchannels are printed.

Figure 7A:
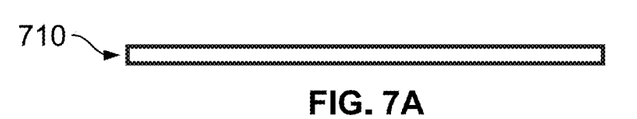
FIGS. 7A-7E provide cross-sectional illustrations of a process flow for forming additively manufactured featured plates and a corresponding microchannel heat exchanger in accordance with one or more embodiments of the present invention.
Figure 7B:
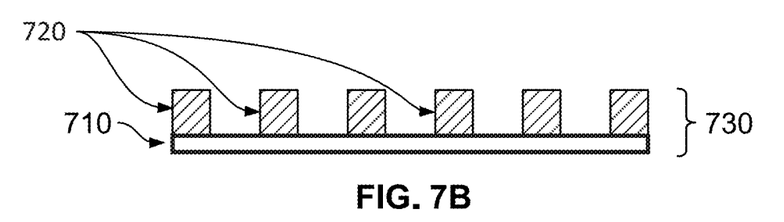
Figure 7C:
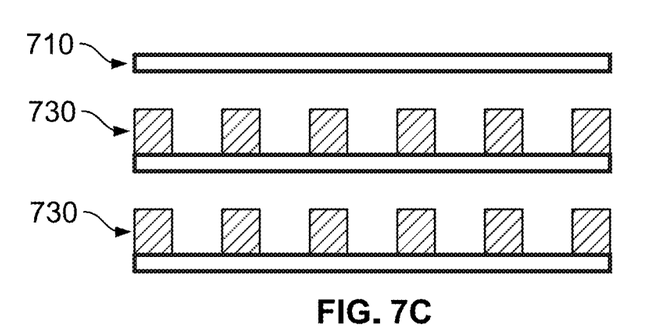
Figure 7D:
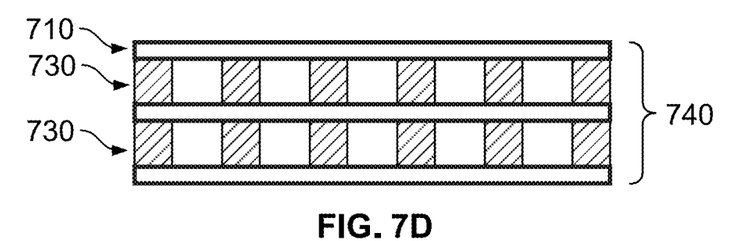
Figure 7E:
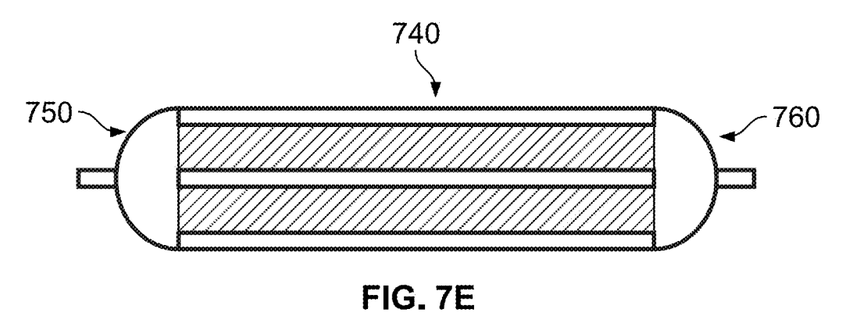

FIGS. 7A-7E provide cross-sectional illustrations of the process flow 600 described above with reference to FIG. 6. FIG. 7A illustrates a plate substrate 710 and corresponds to step 610. FIG. 7B illustrates the plate substrate 710 with walls 720 printed using an AM process, i.e., an AM featured plate 730, and corresponds to step 620. FIG. 7C illustrates a pair of AM featured plates 730 and a cap plate substrate 710 in alignment and corresponds to part of step 650. While FIG. 7C illustrates only a pair of AM featured plates 730, an actual microchannel heat exchanger could include hundreds or thousands of AM featured plates 730. FIG. 7D illustrates a pair of AM featured plates 730 and a cap plate substrate 710 that have been bonded together to form a core 740 and corresponds to step 660. FIG. 7E illustrates a core 740 rotated by 90° to which a hot inlet header 750 and a hot outlet header 760 have been attached, corresponding to step 670.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A process for forming a microchannel heat exchanger core, the process comprising the steps of:
   providing one or more plate substrates;
   printing microchannel walls on the one or more plate substrates using an additive manufacturing (AM) process, thereby producing one or more AM featured plates;

bonding the one or more AM featured plates together to form the microchannel heat exchanger core, the bonding step adapted to simultaneously join the AM featured plates and densify the microchannel walls; and forming hot and cold inlet and outlet headers adjacent to the microchannel walls.

2. The process of claim 1,
wherein the one or more plate substrates include one or more of a metal, a metal alloy, or a ceramic; and
wherein the one or more plate substrates have a thickness of between approximately 0.1 mm and 3 mm.

3. The process of claim 1,
wherein the microchannel walls have a width of between approximately 0.1 mm and 3 mm; and
wherein the microchannel walls have a height of between approximately 0.1 mm and 3 mm.

4. The process of claim 1, wherein the microchannel walls include one or more of a metal, a metal alloy, a ceramic, or a precursor material.

5. The process of claim 1,
wherein the AM process is a screen printing process employing an ink, the ink including metal particles, a photopolymer, and optionally cellulose acetate propionate; and
wherein the screen printing process includes the steps of:
exposing the photopolymer to light, the light adapted to cure the photopolymer; and
burning off at least the photopolymer.

6. The process of claim 1, wherein the AM process is a cold spray process.

7. The process of claim 6, wherein the cold spray process includes a step of selective laser annealing.

8. The process of claim 1, wherein the AM process is a laser bed powder fusion process.

9. The process of claim 8, wherein the laser bed powder fusion process includes a step of laser polishing or a plasma arc flash lamp process.

10. The process of claim 1, wherein the bonding step employs heat.

11. The process of claim 10, wherein the bonding step further employs pressure.

12. The process of claim 1, wherein the bonding step employs one of diffusion bonding, transient liquid phase bonding, brazing, or reaction bonding.

13. The process of claim 1,
wherein the printing step produces a plurality of AM featured plates on each of the one or more plate substrates; and
wherein the process of claim 1 further includes a step of dicing the plurality of AM featured plates on each of the one or more plate substrates.

14. The process of claim 1, wherein the forming step includes one of attaching the hot and cold inlet and outlet headers to the microchannel heat exchanger core or forming the hot and cold inlet and outlet headers integral with the microchannel heat exchanger core.

15. The process of claim 1, wherein the AM process is one of a screen printing process, a cold spray process, a laser bed powder fusion process, an electron beam powder bed fusion process, or a laser flash sintering process.

16. The process of claim 1, wherein the bonding step employs one of diffusion bonding, transient liquid phase bonding, brazing, or reaction bonding.

* * * * *